US010637658B2

(12) United States Patent
Peddada et al.

(10) Patent No.: US 10,637,658 B2
(45) Date of Patent: Apr. 28, 2020

(54) SECURE INTERNAL USER AUTHENTICATION LEVERAGING PUBLIC KEY CRYPTOGRAPHY AND KEY SPLITTING

(71) Applicant: salesforce.com, inc., San Francisco, CA (US)

(72) Inventors: Prasad Peddada, Alameda, CA (US); Taher Elgamal, San Francisco, CA (US)

(73) Assignee: SALESFORCE.COM, INC., San Francisco, CA (US)

(*) Notice: Subject to any disclaimer, the term of this patent is extended or adjusted under 35 U.S.C. 154(b) by 280 days.

(21) Appl. No.: 15/476,833

(22) Filed: Mar. 31, 2017

(65) Prior Publication Data

US 2018/0212762 A1    Jul. 26, 2018

Related U.S. Application Data

(63) Continuation-in-part of application No. 15/415,451, filed on Jan. 25, 2017.

(51) Int. Cl.
*H04L 9/08* (2006.01)
*H04L 9/32* (2006.01)
*G06F 21/34* (2013.01)

(52) U.S. Cl.
CPC .............. *H04L 9/085* (2013.01); *G06F 21/34* (2013.01); *H04L 9/3234* (2013.01); *H04L 9/3271* (2013.01)

(58) Field of Classification Search
CPC ... H04L 9/3271; H04L 9/3297; H04L 9/3236; H04L 9/085; H04L 9/0863; G06F 21/31; G06F 2221/2111; H04W 12/06
See application file for complete search history.

(56) References Cited

U.S. PATENT DOCUMENTS 5,577,188 A   11/1996 Zhu
5,608,872 A   3/1997 Schwartz et al.
(Continued)

OTHER PUBLICATIONS

Burr et al., Electronic Authentication Guideline, NIST Special Publication 800-63-2, National Institute of Standards and Technology, US Dept. of Commerce, http://dx.doi.org/10.6028/NIST.SP.800-63-2.

*Primary Examiner* — Lynn D Feild
*Assistant Examiner* — Abdullah Almamun
(74) *Attorney, Agent, or Firm* — Schwabe Williamson & Wyatt

(57) ABSTRACT

In a computing system, methods for secure OS level login authentication for internal users to access servers. Some or all servers in a group each utilize a local ID Service for generating and validating a challenge responsive to an OS login request. The challenge is processed in a centralized secure server HSM. Rather than copying individual user public keys to each host in the data center, we need only copy the public key of the HSM to each host in the group. When a user attempts OS level login to a host, it encrypts the challenge using the public key of the HSM and forwards the request for processing in the HSM. There, it decrypts the challenge using the private key in the HSM and re-encrypts the challenge with the public key of the individual user. The user's mobile device, previously registered, is required to complete the authentication process.

19 Claims, 10 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,647,260 B2 | 11/2003 | Dusse |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,386,720 B2 * | 6/2008 | Sandhu ............... H04L 9/3271 380/277 |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,032,927 B2 | 10/2011 | Ross |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,166,299 B2 | 4/2012 | Kemshall |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,649,766 B2 | 2/2014 | Kemshall |
| 9,363,077 B2 | 6/2016 | Kemshall |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |

(56) References Cited

U.S. PATENT DOCUMENTS

| | | |
|---|---|---|
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0033392 A1* | 2/2007 | Ganesan ............... H04L 9/0822 713/155 |
| 2008/0172730 A1* | 7/2008 | Sandhu ................... H04L 63/06 726/9 |
| 2008/0229104 A1* | 9/2008 | Ju ......................... H04L 9/3247 713/169 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2016/0080157 A1* | 3/2016 | Lundstrom ........... H04L 63/126 713/176 |

* cited by examiner

TOKEN MODEL

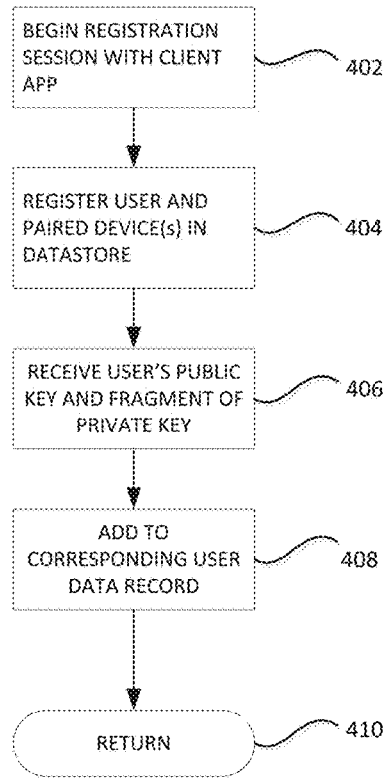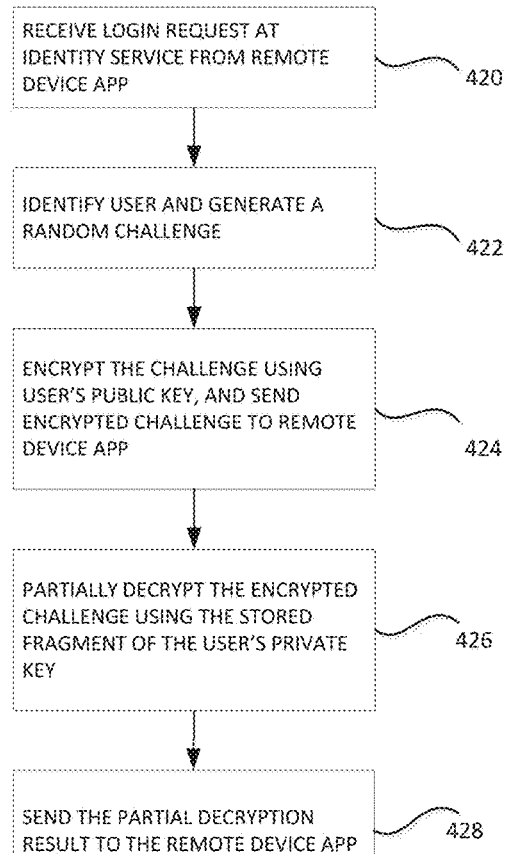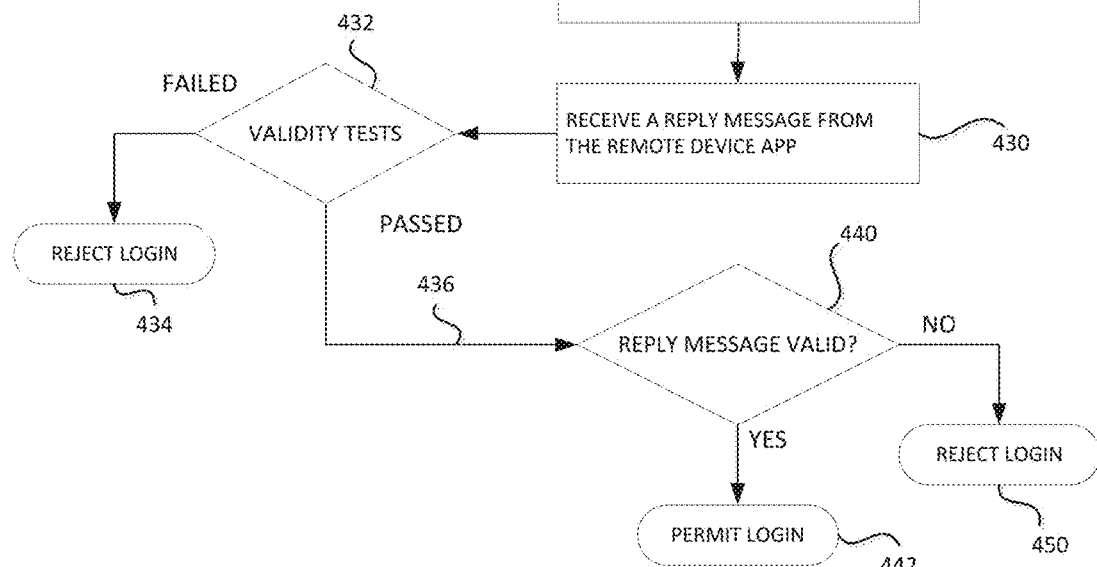
FIG. 4A
FIG. 4B

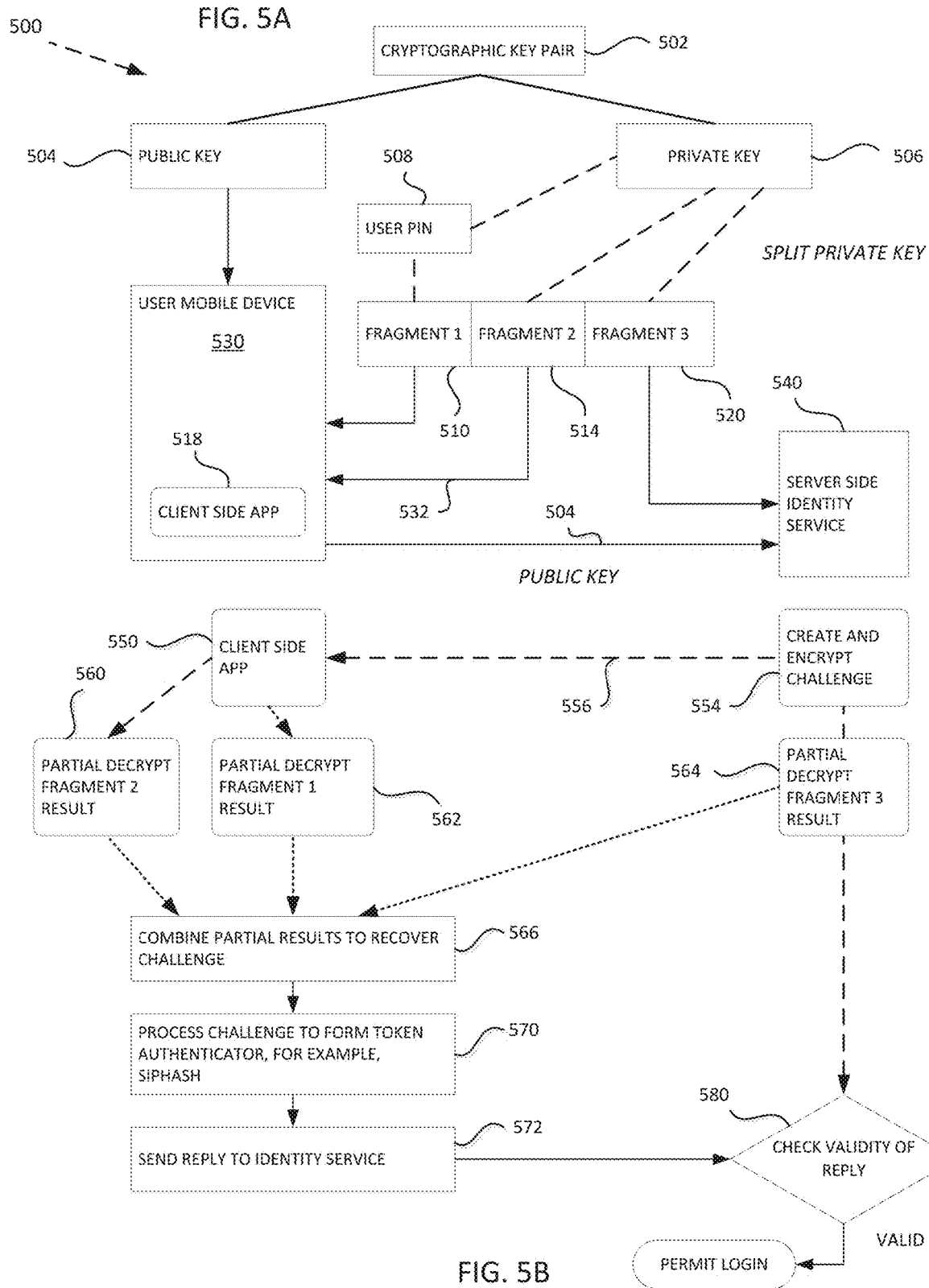

US 10,637,658 B2

SECURE INTERNAL USER AUTHENTICATION LEVERAGING PUBLIC KEY CRYPTOGRAPHY AND KEY SPLITTING

RELATED CASE

This application is a continuation-in-part (CIP) of co-pending application Ser. No. 15/415,451 filed Jan. 25, 2017.

COPYRIGHT NOTICE

Copyright 2016-2017 salesforce.com, inc. A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology relates to electronic user authentication to grant access to an information system.

BACKGROUND

Historically, access to computing resources and data may be limited to authorized users. Typically, an authorized user may be authenticated by a username-password pair. The password is kept confidential, but storage of passwords on a host presents a risk of compromise, for example, by a hacker. Two-factor authentication improves security, but still requires a password and adds additional burden on the user. Passwords are increasingly problematic because complex passwords are hard to remember for humans; people reuse passwords at several sites, thus increasing the risks; and forced rotation of passwords for compliance reasons often ends up weakening security of the system. For internal users such as employees and contractors, turnover, new hires, and the like complicate the challenge of controlling access across large numbers of servers. The need remains for improvements in user authentication.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 4A shows a simplified flow diagram of an example process for user registration and setup that may be implemented in a server side identity service.

FIG. 4B shows a simplified flow diagram of an example process for remote user authentication and login that may be implemented in a server side identity service.

FIG. 5A is a simplified conceptual diagram of a key splitting process in accordance with aspects of the present disclosure to enable secure remote user authentication.

FIG. 5B is a simplified conceptual diagram of a remote login process in accordance with aspects of the present disclosure to enable secure remote user login without requiring a password.

DETAILED DESCRIPTION

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

As noted above, passwords and the like are sorely lacking in security and convenience to limit access to a host system, for example, a database system or application service provider and the like. In this disclosure, we describe some examples and embodiments that enable secure remote user authentication leveraging public key cryptography and key splitting. These designs obviate the need for a user to remember complex passwords, while improving security.

I. Example System Overview

Figure 1A:
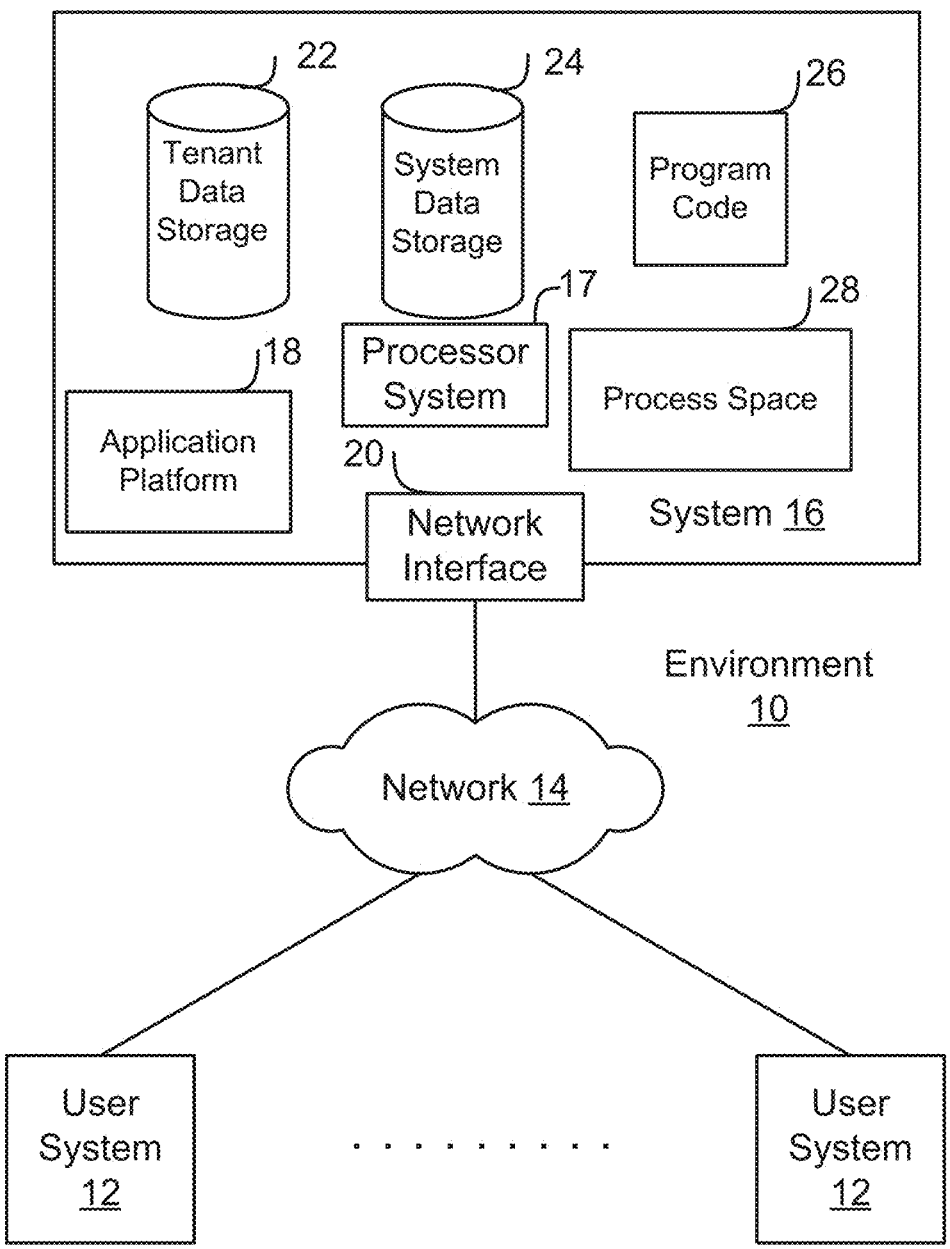
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, the) may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
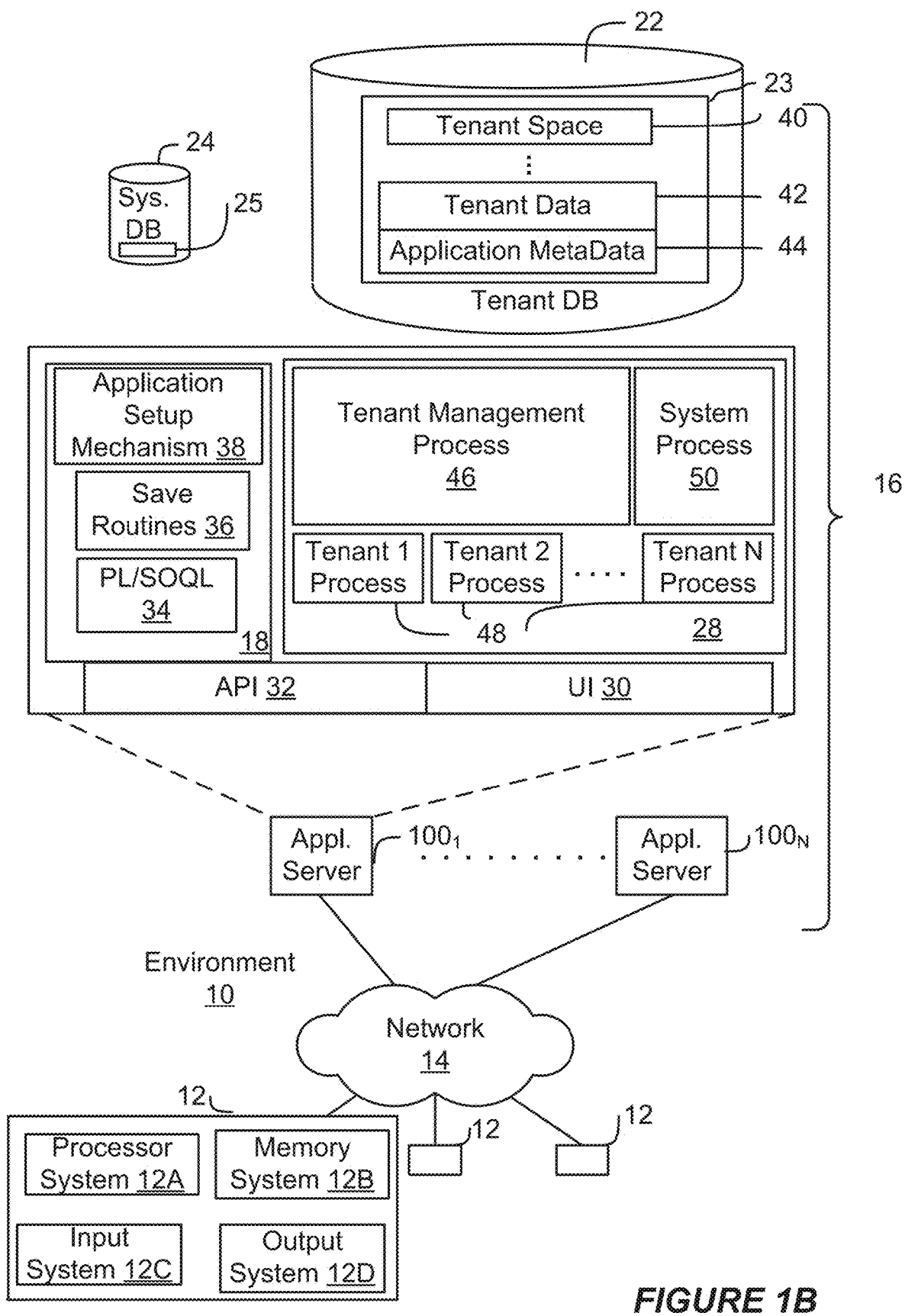
FIG. 1B shows a block diagram of example implementations of elements of FIG. 1A and example interconnections among these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 102, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. User Authentication Services

User authentication may be used to limit access (login) to a host or database system to only authorized users. Historically, this was done with a username-password pair, where the password is kept confidential. However, storing passwords in the system presents a risk of compromise, for example, when a hacker breaks into the password datastore.

Figure 2:
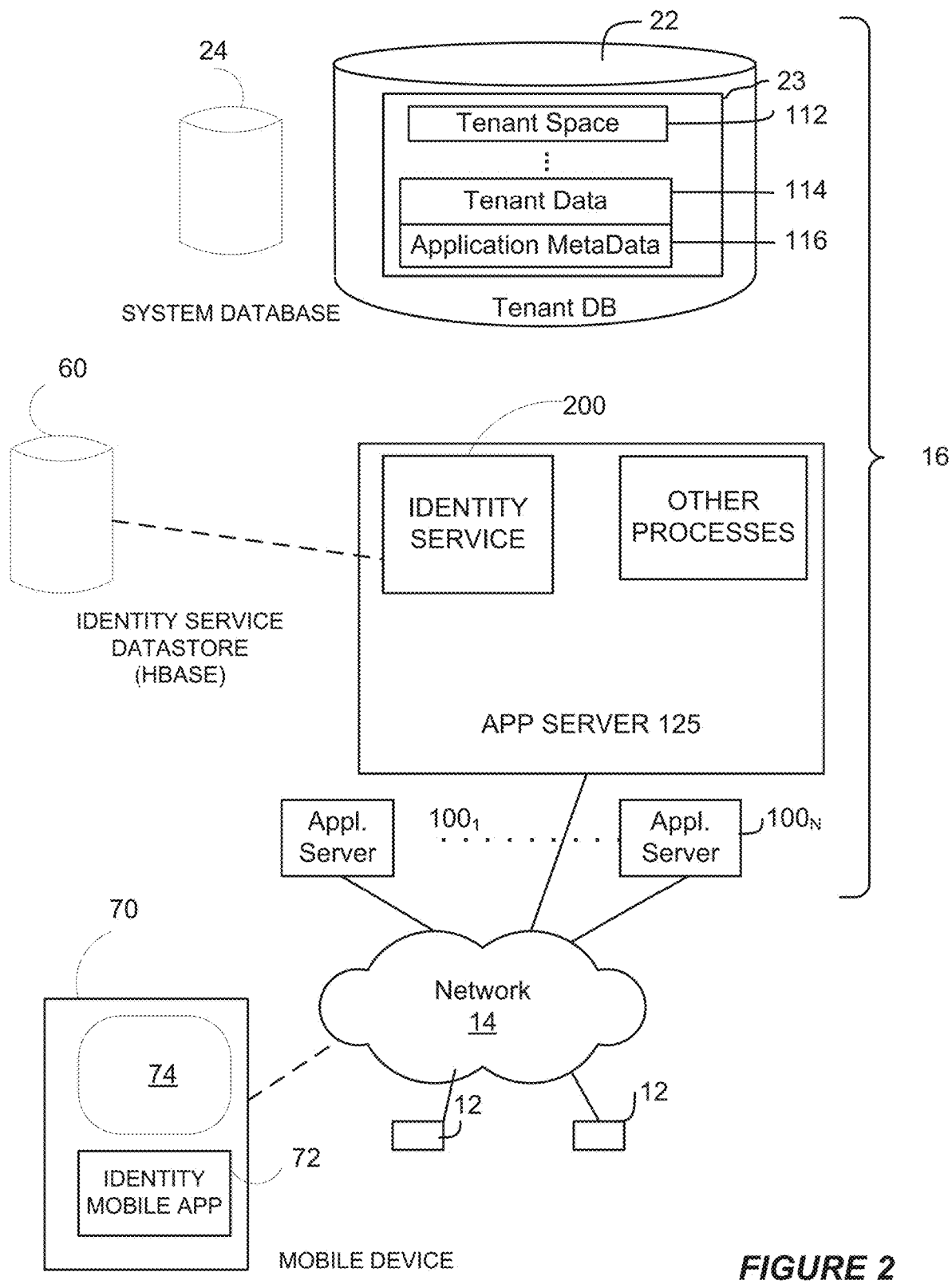
FIG. 2 shows a simplified block diagram of example implementations in which an identity service is provisioned in a database service for user authentication consistent with the present disclosure.

FIG. 2 shows a simplified block diagram of example implementations in which an identity service is provisioned in a database service 16 for user authentication. Selected elements of FIGS. 1A and 1B are shown, with the reference numbers retained. Here, in app server 125, an identity service 200, typically implemented in software, is provided. A similar identity service instance may be implemented in some or all of the other app servers, $100_1$-$100_N$. In other embodiments, multiple app servers may use a common identity service (not shown) for user authentication.

The identity service 200 has access to a datastore 60. There it may store user information further described below. In an embodiment, the stored user data may comprise, for each user, an identifier (for example, a username, and an encryption key, generally comprising a public key and a corresponding private key. The identity service datastore 60 preferably is distinct from the system database 24 which may be, for example, a relational database system. The identity service datastore 60 preferably is implemented in an HBASE or other datastore of that general type. HBase is an open source, non-relational, distributed database modeled after Google's BigTable and is written in Java. It is developed as part of Apache Software Foundation's Apache Hadoop project. The identity user data in datastore 60 may be backed up in the system database 24 or other datastore in system 16.

A mobile device, for example, a smartphone 70 has the ability to communicate with the system 16, and more specifically with an app server 125, over network 14. The mobile device may utilize a web browser or other suitable app to access resources in the system 16. To do so, the user must first login to the system, which requires authentication of the user. Authentication may be carried out by the identity service 200 or similar program running on or coupled to the app server 125. The ID service 200 generally interacts with a suitably-configured client side application to conduct user authentication. The client side application may be an identity user app 72 installed on the mobile device 70. In other embodiments, similar functionality may be implemented in browser plug-in, scripts, or other methods. In the following description, we use a client side application or "app" to describe an embodiment by way of example and not limitation.

Figure 3A:
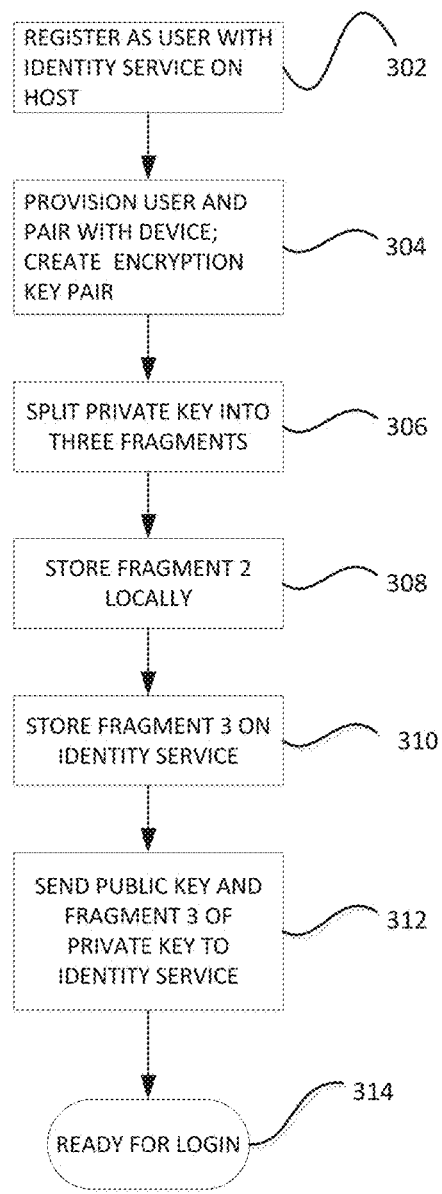
FIG. 3A shows a simplified flow diagram of an example process for user registration and setup that may be implemented in a client side application.

FIG. 3A shows a simplified flow diagram of an example process for user registration and setup that may be implemented in a client side application. At block 302, a user may register with an identity service, for example, 200 (FIG. 2) to set up an authentication account. The primary purpose is to enable subsequent secure login to a selected software service without relying on traditional use of a password. In an embodiment, a password may still be used for added security; but the illustrated process makes use of a password unnecessary. The client app provisions the user and pairs the user with at least one mobile device, block 304. A user may be associated with multiple devices. Conversely, multiple users may utilize the same mobile device. Device identification through various means are known.

The app creates or acquires an asymmetric encryption key pair for the user, using methods that are known. For example, a key pair may be acquired using RSA or ElGamal technologies. The key pair consists of a public key and a corresponding private key. Modern security standards recommend that the key length (referring to the private key exponent) be at least 2096 bits or higher, as longer keys provide better security. The exact key length is not critical to the concepts in this disclosure.

Next, the process of FIG. 3A splits the private key into plural key fragments. In one example, the process may split the private key into three fragments, block 306, as follows. A user-selected PIN, which generally is not the PIN used to access a mobile device at a lockscreen, is used to determine a first fragment of the private key. The PIN preferably comprises at least four decimal digits, and it should be memorized by the user. The PIN itself may be used as a first one of the segments in the three-fragment example. In this example, the PIN should not be stored on the client device. The client app may request that the user input her PIN during the process of FIG. 3A. Preferably, the PIN is specific to the client application/device and a specific private key. Different PINS may be used for different applications, service providers (information systems), etc.

Second and third fragments (i.e., additional, non-identical fragments) of the private key may be calculated as follows: First, subtract the first fragment (the user's PIN) from the private key to form a difference; randomly select a non-zero portion of the difference to form the second fragment; and finally, subtracting the first fragment and the second fragment from the private key to form the third fragment, so that an arithmetic sum of the first, second and third fragments equals the private key value.

At block 308, the second fragment may be stored locally in the mobile device. The second fragment preferably may be secured. In some embodiments, one or two fragments may be secured in the mobile device, for example in a "key chain." The Apple iCloud Keychain for example, protects passwords, credit card data, and other information on a device, as well as in transit, using encryption. In some embodiments, one or two fragments may be secured in the mobile device by requiring a biometric input of a user to access it. The biometric input may be, for example, a fingerprint or facial image or retinal scan. These inputs may be acquired by suitable sensors or devices that are integral to the mobile device or coupled to it (for example, a dongle). In general, one or more of the private key fragments must be stored under control of the mobile device and its user. The entire private key should not be retained. At block 310, the third fragment is to be stored on the identity service, for example, 200 in FIG. 2, as further described below. In a two-fragment embodiment, one fragment is stored under control of the mobile device and its user, and the other fragment is conveyed to the server side.

At block 312, the client app sends the user's public key and at least one fragment of her private key, but not all of the private key, to the identity service to register the user on the server side. The client side app conveniently retains all of the segments that are <u>not</u> sent to the server side, or at least has access to them. In an embodiment, a first segment is not necessarily stored explicitly on the device, but it may be provided by the user in the form of a PIN. Accessing the stored private key segments may involve a hardware dongle or other devices. For example, in a variation on 2FA, a user's smart watch may be required to be near a mobile device for the client app to access one or more of the retained private key fragments. To summarize, in an embodiment, one or more of the split key fragments are sent to the server side identity service, and all of the remaining segments that are not sent to the server side are retained on the client side (or the client side app has access to them). Then the app is ready to manage a remote login request for the user, block 314, as needed.

FIG. 5A is a simplified conceptual diagram 500 to further illustrate one example of a private key-splitting registration process in accordance with aspects of the present disclosure to enable secure remote user authentication. A cryptographic key pair, for example, an asymmetric key pair 502 is generated or acquired. The key pair comprises a public key 504 and a private key 506, details of which are known. Typically, the key pair is associated to a single user. The key pair may be acquired by or generated in a user mobile device 530, for example, a smartphone, tablet computer, etc. The key pair thus is accessible to a client side app 518 that is executable on the mobile device. In an embodiment, the app 518 may correspond to the identity mobile app 72 in FIG. 2.

A user PIN 508 may be used to calculate a first fragment 510 of the private key. The first fragment may be formed by subtracting the PIN from the private key. The client app should not store the first fragment 510 in the mobile device 530. A second fragment 514 of the private key may be calculated as described above, and it too stored in the mobile device 530, see path 532. A third fragment 520 also is calculated as described above, and then sent to the server side identity service 540. The public key 504 also is sent to the identity service. The terms "first," "second," etc. in this application do not imply a temporal limitation or sequence; to the contrary, many of the steps described may be accomplished in a different order. Neither do these terms imply any particular limitations, relationships or features of the key fragments; rather, the ordinal adjectives are merely used to distinguish one fragment from its brethren.

The registration process of FIG. 3A generally need be done only once for a given user-device pair. The app may be configured to enable adding additional devices (or removing devices) for the same user. These changes may require sending an update to the server side identity service. Creating and processing a new encryption key pair for a user, generally as described with regard to FIG. 3A, may be done, either by requirement or user option, in response to various events, such as a device malfunction, lost device, or simply the passage of a predetermined time interval. For example, as software and hardware evolve, new longer keys may be advantageous. Utilizing a new key pair may require repeating the registration process.

Figure 3B:
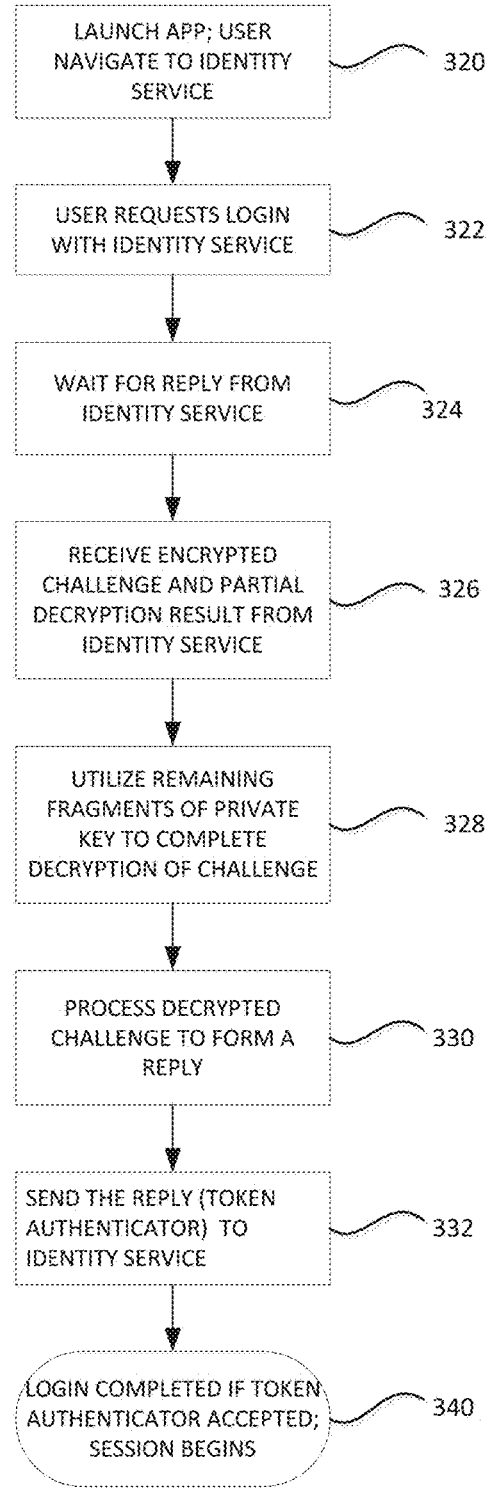
FIG. 3B shows a simplified flow diagram of an example process for remote user authentication and login that may be implemented in a client side application.

FIG. 3B shows a simplified flow diagram of an example process for remote user authentication/login that may be implemented in a client side application or authentication service. We assume the user has registered previously, for example, as described above with regard to FIG. 3A. We continue the three-fragment example for illustration. In an embodiment, the user may launch an application or a web browser, and navigate to a remote host, block 320. The remote host may be in a system 16 as illustrated in FIGS. 1A, 1B, and 2.

The user requests login to the remote system, block 322. The request may be handled by an identity service (200 in FIG. 2). The login request typically identifies the user and or device seeking to login. The client side app may wait for a message from the identity service, block 324. The message (or more than one message) conveys at least two things from the system or service to the remote client; namely, (1) a "challenge," encrypted with the user's public key, and (2) a partial decryption result, i.e. a result of decrypting the encrypted challenge using a fragment of the user's private key that was previously provided to the identity service (during registration, see 312 in FIG. 3A). The client side app receives this data, block 326. In some embodiments, either "push" or "pull" models may be implemented for communications between the server side and the client app. Details of various communication protocols and data transfer methods are known. One advantage of the methods described herein is resistance to "man in the middle" attacks.

Next, at block 328, the client side app utilizes the remaining fragments of the user's private key (one or more fragments that were not sent to the server side) to complete decryption of the encrypted challenge. In more detail, in the example that the private key had been split into three fragments (as in FIG. 3A), assume the third fragment is the one sent to the server side during registration. (See 520 in Figure A.) Then the client app would be configured to: (1) decrypt the encrypted challenge using the second fragment to form a second partial decryption result; (2) decrypt the encrypted challenge using the third fragment to form a third partial result; and (3) combine the first, second, and third partial results to recover the challenge, that is, to completely decrypt it. To illustrate, assume the partial results are represented by P1, P2 and P3 respectively, and "Modulus" is the modulus of the user's asymmetric key pair. The following relationships apply to recover the challenge:

Equations $P1$=partial result received from server side=encyptedChallenge.modPow(fragmentOne, Modulus)      (EQN. 1)

$P2$=encyptedChallenge.modPow(fragmentTwo,Modulus)      (EQN. 2)

$P3$=encyptedChallenge.modPow(fragmentThree, Modulus)      (EQN. 3)

(decrypted)Challenge=($P1 \times P2 \times P3$)mod Modulus      (EQN. 4)

Figure 3C:
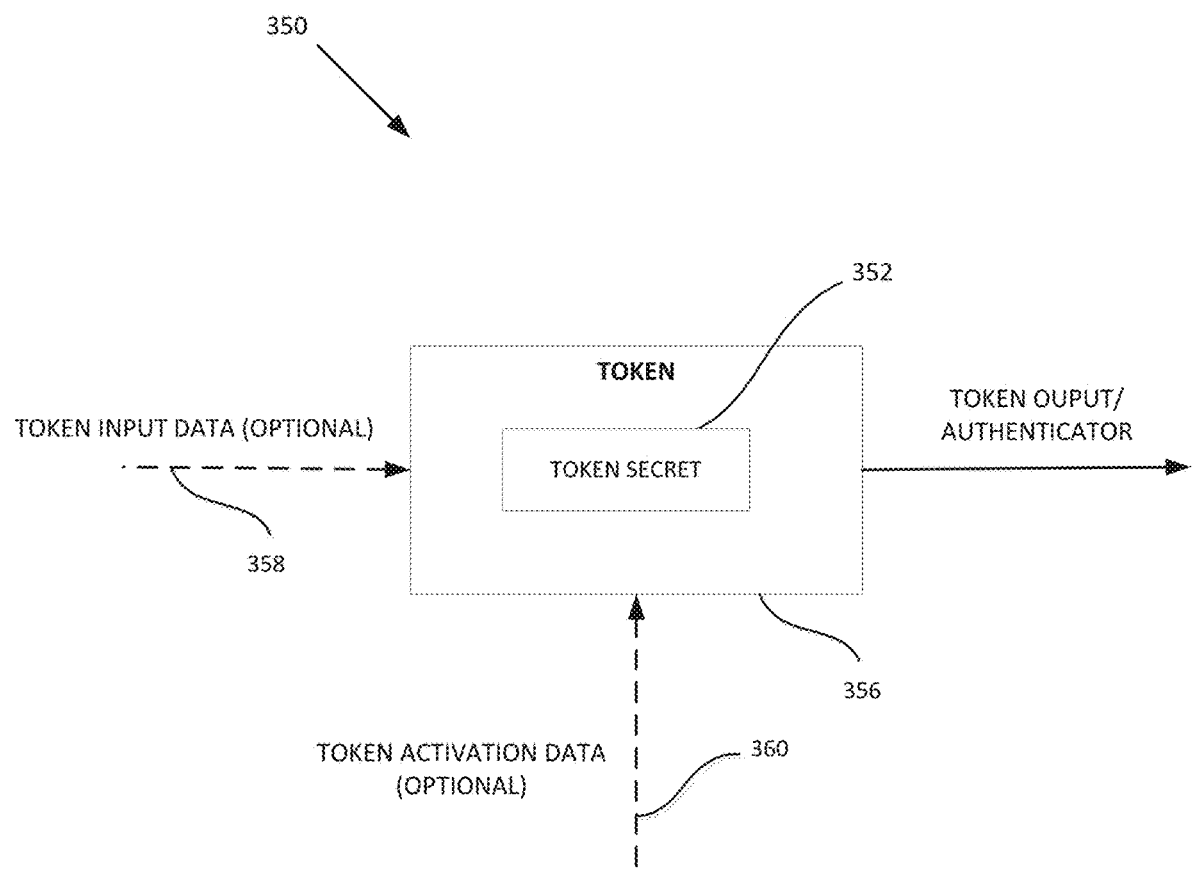
FIG. 3C is a conceptual model of a token used in authentication processes.

Next, the client app processes the decrypted challenge (Eqn. 4) to form a reply to the identity service, block 330. This reply may comprise a "token authenticator," where the corresponding token secret (352 in FIG. 3C) comprises the one or more key fragments controlled by the client app. In general, a token may be modeled as an entity that contains a secret to be used in authentication processes. Tokens are generally possessed by a "Claimant" (in the present example, the remote device/user), and controlled through one or more of the traditional authentication factors (something you know, have, or are). FIG. 3C depicts an abstract model for a token. The token authenticator proves that the client app/user has access to the token key fragment(s). In this model, the token input data 358 may comprise the decrypted challenge.

In one embodiment, the token authenticator may include the entire (decrypted) challenge explicitly. In other cases, the token authenticator may comprise one or more values derived from the challenge. For example, the token authenticator may include a cryptographic (one-way) hash of the decrypted challenge or perform key a derivation function using the decrypted challenge to produce a token authenticator. A Hash function is a function that maps a bit string of arbitrary length to a fixed length bit string. Approved hash functions satisfy the following properties: 1. (One-way) It is computationally infeasible to find any input that maps to any pre-specified output, and 2. (Collision resistant) It is computationally infeasible to find any two distinct inputs that map to the same output.

In an embodiment, the token authenticator may comprise a SipHash of the decrypted challenge. Other functions of the challenge may be used. Optionally, other token input data 358 and or token activation data 360 may be employed in generating the token authenticator. For example, token input data (aside from the challenge) may be supplied by the user or be a feature of the token itself (e.g. the clock in an OTP device).

Token authenticators generally are much smaller than the challenge itself, although this is not a requirement. Cryptographic [one-way] hash function functions, among others, may help to make the token authenticators harder to reverse engineer. The function of the token authenticator again is to prove to the identity service that the challenge was successfully decrypted on the client side, thus proving that the client app/user had possession of (or access to) at least the remaining part(s) of the private key that was not provided to the identity service. The selected token authenticator is sent to the identity service, block 332. The service checks the reply for validity, as further described below, and if it is valid, login is permitted, block 340. This arrangement is especially advantageous because users don't have to remember complex passwords, or rotate them. The private key may never be re-assembled after key splitting. Mass compromise is extremely hard, in part because the server side stores only a user's public key and a fragment of her private key. That data is of little or no value to a hacker.

FIG. 4A shows a simplified flow diagram of an example process for user registration and setup that may be implemented in a server side identity service, such as service 200 (FIG. 2). The process may begin with establishment of a communication session with a client application, block 402. The process may register a user and at least one identified user device associated (or "paired") with the user, and store the data in an appropriate datastore, block 404. In an embodiment, the identity service may have access to a datastore external to the server on which the identity service may be operable for storing user registration data. For example, a common external datastore may store user registration data for a plurality of servers. The datastore may be a HBASE datastore as described above with regard to FIG. 2. At block 406, the identity service may receive the user's public key and a fragment of the user's private key, as described earlier. The received data may be stored in the corresponding user's data record, block 408. The process may return to a quiescent or standby mode, block 410.

FIG. 4B shows a simplified flow diagram of an example process for remote user authentication and login that may be implemented in a server side identity service (the "service"). At block 420, the service may receive a login request from a remote user. The request may be initiated by an application on a remote device. The service may identify the user and/or her device from the request, and thus have access to data previously stored during registration of the user. The service generates a random challenge, block 422. The challenge may be generated by a random number generator. Preferably, it should be generated by a cryptographically robust random number generator. The challenge should have a selected bit length on the order of the user's public key modulus length, say for example, on the order of 2,096 bits. The exact number of bits is not critical, although the challenge should not be equal to the modulus in length. More generally, the challenge generation should meet good security design practices. In an embodiment, a random challenge may be generated for each login request, even if the request is from a user already or recently logged in.

At block 424, the service encrypts the challenge using the user's public key. In an embodiment, the encryption may be done using a suitable code statement such as, "BigInteger encryptedChallenge=challenge.modPow (PUBLIC_EXPONENT, MODULUS)." The encrypted challenge is sent to the remote device making the login request. The service also may partially decrypt the encrypted challenge using a fragment of the user's private key, block 426. The private key fragment may be stored in local or a separate datastore accessible to the identity service. For example, to illustrate in pseudocode, if the fragment accessible to the service is "FragmentThree," the partial decryption may be realized by, "BigInteger partial result3=encryptedChallenge.modPow (FragementThree, MODULUS)." Next, block 428, the service sends the partial encryption result to the remote device.

In some cases, there may be no PIN. In an embodiment, a first fragment may be determined by subtracting a randomly selected number from the private key. The remainder may be randomly split to form second and third fragments. In another embodiment, there may be only two fragments. For example, first and second fragments may be formed by randomly splitting the private key into two parts; that is, subtracting a random portion from the private key to form the first fragment, and then the remainder becomes the other (second) fragment. In pseudocode, "BigInteger FragmentOne=(RAN<1.0)×Private_Exponent; BigInteger FragmentTwo=Private_Exponent.subtract(FragmentOne)."

Referring again to FIG. 4B, the service waits for a reply message from the remote device requesting login. In some alternative arrangements, the service may "pull" a reply from the remote device. Various known communication protocols may be used (or one later developed). After receiving a reply message, block 430, the service may apply one or more validity tests to the reply message, decision 432. For example, it may check a "time to live" (TTL) of the challenge. If the TTL has expired, the login may be rejected, block 434. In an embodiment, the service may check a geographic location of the remote device, and apply predetermined geographic restrictions. If the device apparently is outside of a permitted area, the login may be rejected. Another test may determine whether the user/device is already logged in, i.e. a corresponding session already exists. Logic may be applied to permit one session and terminate the other. In another example, a maximum number of login tries, say three, may be applied. These and other tests may be applied in various combinations to improve security.

If the tests at 432 are passed, the process proceeds via 436 to test validity of the reply message, decision 440, with regard to the encrypted challenge that was issued at block 424. The order is not critical; test 440 may be conducted before or after tests 432; the point is that all applicable tests must be passed to permit the requested login. At decision 440, the service examines the reply message, which preferably includes a token authenticator as described above. The service determines whether or not the token authenticator demonstrates successful decryption of the challenge. In general, any token authenticator demonstrating decryption of the challenge may be used to permit login, block 442, assuming other requirements (432) are met. Conversely, if one or more validity tests fail, the login is rejected, block 450.

FIG. 5B is a simplified conceptual diagram of a remote login process in accordance with aspects of the present disclosure to enable secure remote user login without requiring a password. In this figure, the operations on the right side are carried out at a server, for example, an app server 125 in FIG. 2. These functions may be implemented in an identity service application, illustrated as 200 in FIG. 2. Returning to FIG. 5B, it assumes that a client side application 550 has made a login request. The server side creates and encrypts a challenge, block 554, and transmits it to the requesting client app via a communication path 556, which may comprise a network. The client side app 550 receives the encrypted challenge. That app conducts a partial decryption of the challenge using a fragment of the user's private key, in this illustration Fragment 2, to form a partial result, block 560. The app also conducts a partial decryption of the challenge using another fragment of the user's private key, in this illustration Fragment 1, to form another partial result, block 562. Illustrative equations are given above. The identity service application on the server side conducts a partial decryption of the encrypted challenge, block 564, using yet another fragment (Fragment 3) of the private key. In an embodiment, the "private key" refers more specifically to the private key of an asymmetric encryption key pair. The identity service application sends a partial result (the Fragment 3 decryption result) to the client side app 550.

The client side app then combines the three partial results, block 566, to recover the challenge. In an embodiment, this combination may be calculated as shown in EQN. 4 above. Next, the app may process the recovered challenge to form a token authenticator, block 570. As discussed above, the token authenticator may comprise a function of the challenge, for example, a hash function of the challenge. It may comprise a Sip Hash of the challenge. Other functions may be used. Hash-type functions reduce the size of the message as compared to sending the entire challenge. Then the client side app sends a reply message comprising the token authenticator, block 572, to the server side, where the identity service checks the reply for validity, decision 580. More details of validity checking are given above with regard to FIG. 4B. If applicable validity checks are passed, the requested login is permitted.

Figure 6:
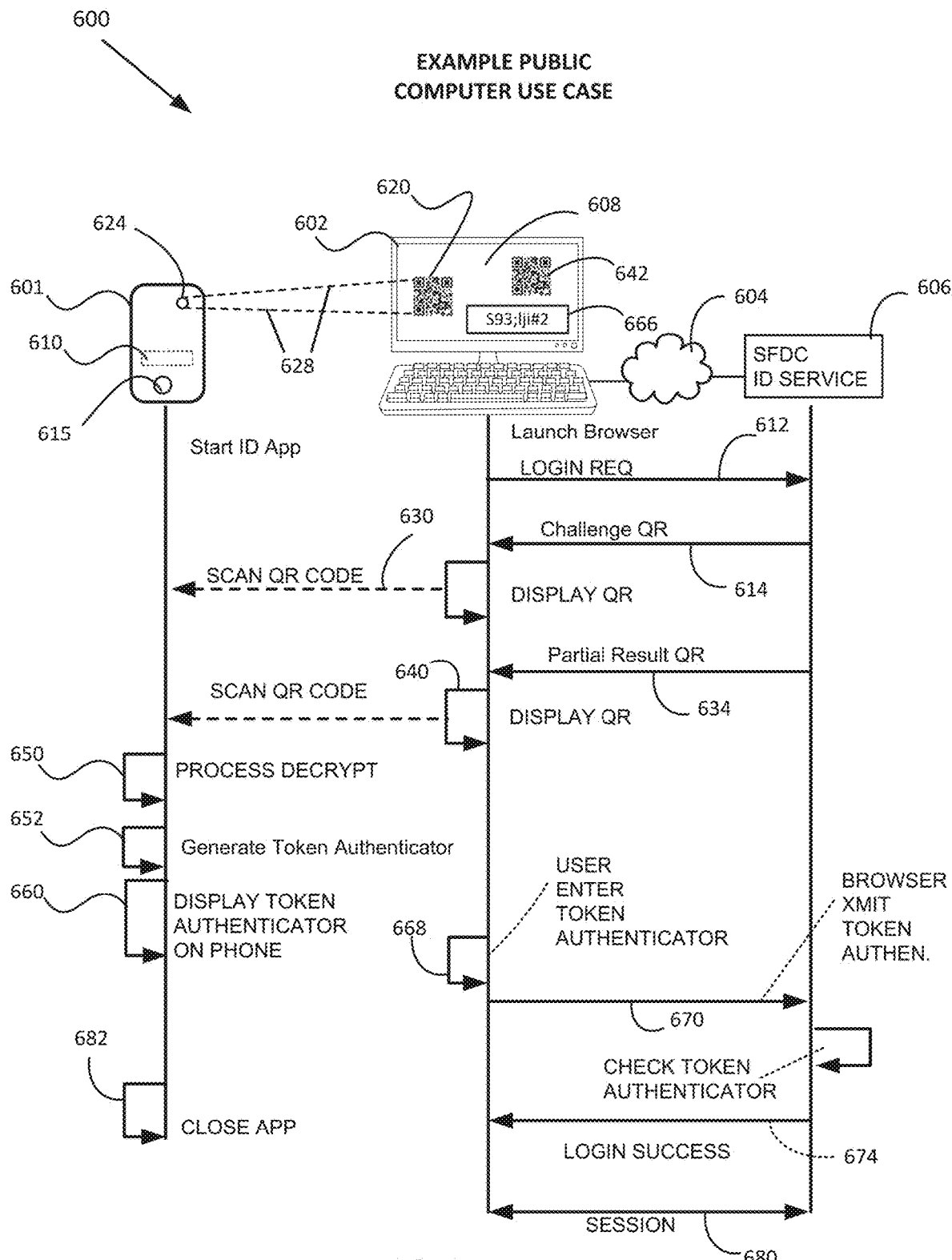
FIG. 6 is a simplified communication diagram to illustrate an example of secure login to a server system from a remote public computer.

FIG. 6 shows a simplified communication diagram 600 to illustrate an example of secure login to a server system from a remote public computer. The use case may be one in which a user who is associated with a mobile device 601, for example, a smart phone, previously registered with an identity service, indicated at 606. For example, registration was described above with regard to FIG. 3A. The user may be traveling, for example, and wishes to login using a public computer 602 at a library or café. The user has her mobile phone 601 with her near the computer 602. The user launches an identification client app 610 on the phone. The user also launches a web browser or the like on the public computer 602, and navigates to the ID service 606, for example, over a network 604 such as the internet. Using the computer/browser, the user sends a login request, 612, to the ID service. Responsive to the request 612, the service 606 generates a random challenge, and encrypts the challenge using the user's public key, as described above. As noted above, the identity service had acquired the user's public key earlier at registration.

The service 606 may send the encrypted challenge to the computer, 614, in the form of a machine readable code, of which there are various known examples, including various bar codes and QR code. We use the QR code for illustration and not by way of limitation. Thus, a QR code 620, which may be transmitted, for example, in an image file such as JPG, TIF, PNG, or GIF formats, may encode the challenge generated by the identity service. A QR Code (it stands for "Quick Response") is a mobile phone readable, 2-dimensional bar code that can store any alphanumeric data. Under international standard ISO 18004, a QR code may store up to 4296 characters. In some examples, the challenge may have a bit length on the order of an asymmetric private key, say 2096 bits. The encrypted challenge may be of similar size. That is equivalent to around 300 ASCII characters, well within the QR code capacity. These numbers are merely illustrative and not critical. The QR code image 620 may be displayed on the display screen 608 of the public computer 602. Embedding the challenge into a QR code is not important for security; it serves as a convenient mechanism as follows.

The user's mobile phone 601 has a camera 624 or other optical sensor capable of capturing the QR code image 620 from the computer display screen. This image capture is indicated by dashed lines 628 and the "Scan QR Code" dashed line 630 in the diagram below. The phone software is configured to recover the encrypted challenge from the QR code, and provide it to the identity client app 610.

The ID service 606 also generates a partial decryption result, as described above, and encodes the partial result into a QR code. The partial result QR code is sent, path 634, to the computer 602 for display on the screen 608 as indicated at 640. The partial result may be represented by a second QR code image 642. The second QR code may be captured in the same fashion as the first QR code 620, and the content, i.e., the partial decryption result, provided to the client app 610. In some embodiments, the challenge and the partial result (614,634) may be sent from the ID service in a single code. The mobile device 601 may then capture the single code and process it as follows.

At the mobile device 601, the client app 610 proceeds to decrypt the challenge (acquired from QR code image 620), process 650. Decryption of the challenge may proceed by combining partial decryption results generally as discussed above. In an embodiment, there may be one fragment of the user's private key that was stored on the server side and used to generate the partial decryption results (QR 642). A second fragment of the key may be stored on the mobile device 601. In this example, there may be only two fragments utilized. For example, first and second fragments may be formed by randomly splitting the private key into two parts as described above. The fragment stored on the mobile device may be secured, for example, using a biometric input sensor 615.

Let the received partial result (QR 642) be called PartialResult1; and let a second partial result, formed by decrypting the challenge in the client app using the fragment stored on the client app, be called PartialResult2, then the partial results may be combined using, for example, "BigInteger Challenge=(PartialResult1×PartialResult2)mod Modulus" where, as before, Modulus is the modulus part of the user's asymmetric key pair. The challenge is thus recovered by the client app, completing process 650.

Next, the client app 610 executes a process 652 to generate a token authenticator based on the recovered challenge. Non-limiting examples of generating such a token authenticator were described above. The client app may display the token authenticator, process 660, on the mobile device display screen (for example, 74 in FIG. 2) where the user can read it. The user may then type the displayed token authenticator value, step 668, into an input box 666 or the like provided on the computer display screen 608 by the browser interface for communication with the ID service 606. In this way, the token authenticator generated by the client app may be transmitted to the ID service, see path 670. In this type of application, a relatively short token authenticator may be preferred.

The ID service 606 may then check for validity of the received token authenticator, and it may apply other validity tests as described above. If all applicable tests are passed, then the service may send an indication to the public computer, path 674, that the login request is successful. The requested session 680 then proceeds, with the user logged into the server securely and without the use of a password. The client app on the phone may be closed, 682. In the process of FIG. 6, no encryption keys changed hands, and none were stored on the public computer. The foregoing techniques can be applied to the use of any computer, including one at the user's home or place of work, for secure login to a server. All that is needed is the user's mobile phone, and an existing registration on the ID server.

III. Internal User Authentication

Figure 7:
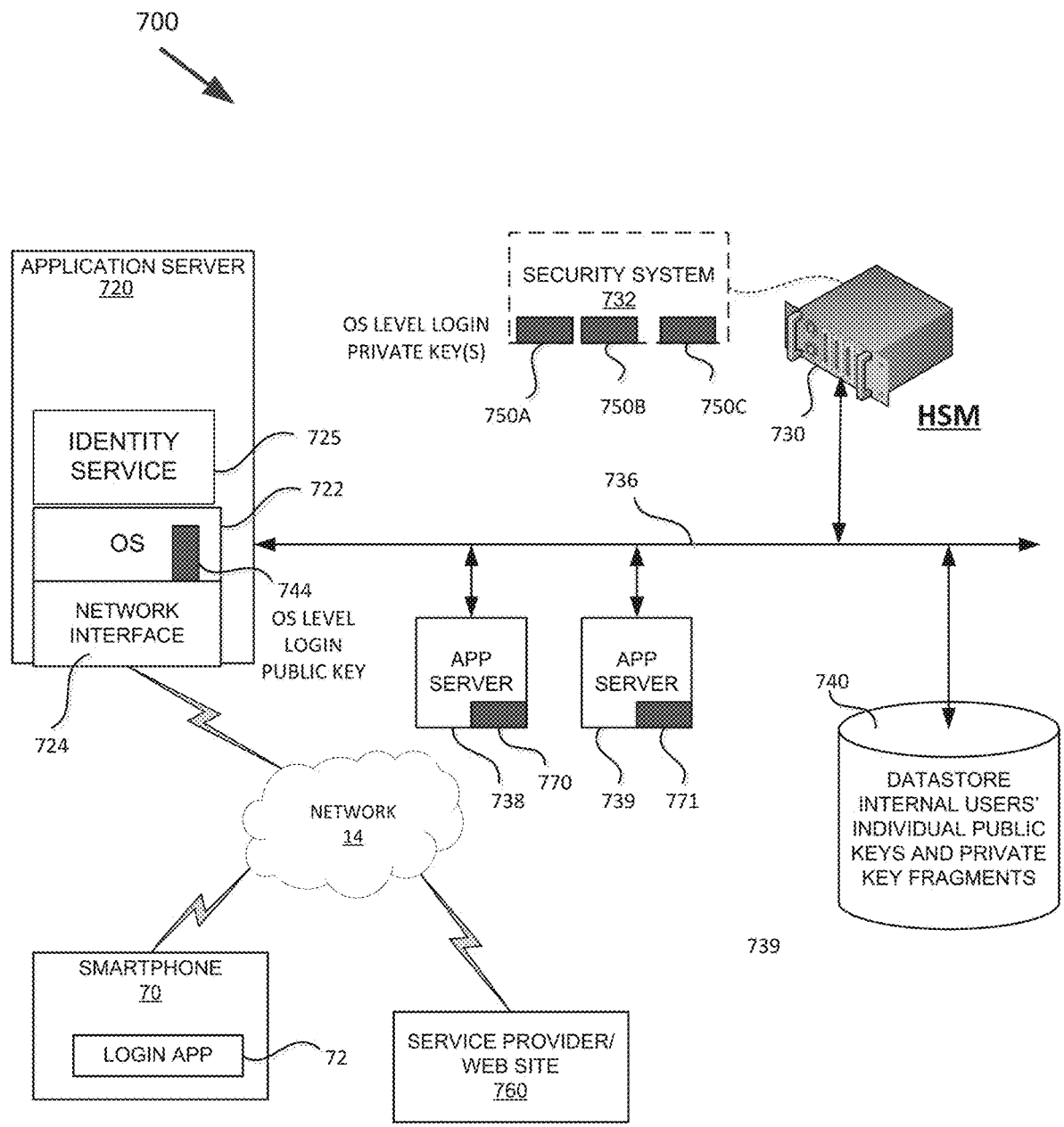
FIG. 7 is a simplified block diagram of an environment in which some embodiments of the present disclosure may be implemented for authentication of internal users of an information system.

FIG. 7 shows a simplified block diagram of an example environment 700 in which some embodiments of the present disclosure may be implemented. Here, we refer to an "internal user" of an information system as a person (usually an employee or contractor of the proprietor of the information system) who is authorized to login at the operating system ("OS") level to a production machine. This authorization is in contradistinction to external or customer users who login to application programs hosted by the information system. In this illustration, an application server 720 may include an operating system OS 722, and a network interface 724 for communications over an external network 14 described above. The network 14 may provide for communications with various remote equipment, including without limitation a service provider web site 760 and a smartphone 70 or other client devices. A smartphone 70 may have a client login application 72 as described in detail above.

The application server 720, which may be representative of many application servers in a single information service (see FIG. 1B), may be coupled over an internal network or connection 736 to a hardware security module or "HSM" 730. A hardware security module (HSM) is a physical computing device that safeguards and manages digital keys for strong authentication and provides cryptoprocessing. These modules traditionally come in the form of a plug-in card or an external device that attaches directly to a computer or network server. In other embodiments, a software solution in the cloud ("virtual HSM") may provide the functionality of the HSM.

The app server 720 has access via 736 to a datastore 740 where individual internal users' public keys may be stored, along with their private key fragments (but not complete private keys). A security system 732, generally implemented in software, is installed for execution by the HSM inside its secure environment. The system 732 is a part of an ID Service component 725 provisioned on each, or at least some of, the app servers. In some embodiments, the ID Service 725 may fetch a user's individual public key from datastore 740, along with a corresponding private key fragment, and provide them to the system 732 on the HSM for authenticating the user as explained below. In some embodiments, for example, for a relatively small number of servers, user public keys may copied to each server, along with the associated private key fragments, obviating the need to fetch them from a shared datastore.

Other application servers 738, 739 may be coupled via network 736 to use the same HSM 730 to authenticate internal users seeking OS level login to those machines. ("Machines" is used here in a broad sense to include without limitation a host, server, virtual machine, etc.) Each app server has a public key 770, 771 for OS level login authentication, which may be the same key as 744 held in server 720. That is, in some embodiments, a single asymmetric encryption key pair can be used for authenticating all internal users of the system. In that case, the same public key of that pair (say 744) can be used in all of the app servers (or other machines) that are to use the authentication system provisioned on the HSM in FIG. 7. The HSM (security system 732) needs to store only the single private key of that encryption key pair, for example, key 750A would correspond to public key 744.

In other embodiments, different OS level login key pairs can be used for different groups of machines or roles. As a simple example, one key pair might be provisioned for all app servers, while a different key pair might be used for OS login to data storage servers. In this case, the corresponding two private keys would be stored in the HSM, illustrated as keys 750B and 750C. In other examples, key pairs may be provisioned by geographic locations of resources of the information system. If the system is distributed over 10 physical sites, or perhaps 10 clusters at one site, there may be 10 key pairs used for OS logins. All machines at a given location or cluster would use the same public key for that location, while the HSM would store all 10 private keys. It should be noted that all of these OS level login key pairs are not individual user keys (or key pairs). Rather, the OS level public keys are used for secure communications with the HSM which holds the corresponding private keys. This encryption "wraps around" the individual user challenge information described below.

In some cases, more than one HSM can be provisioned. A second HSM may be configured to support replication, high availability, or distribute the work load. In some other embodiments, a Trusted Platform Module (TPM) may be used in each server to be protected. TPM is a specialized chip on a device that stores encryption keys specific to the host system for hardware authentication. Performance of the TPM generally is much slower than an HSM, but for a relatively small number of servers, the cost of the HSM may not be justified. Thus it will be appreciated that a wide variety of arrangements can be used for provisioning one or more OS level login key pairs, making the system flexible and scalable while maintaining robust security.

Referring again to FIG. 7, the public key 744 of an OS level login key pair is stored by or in the OS 722 in the application server 720. The corresponding private key 750A is securely stored in the HSM 730 to prevent its disclosure. The HSM supports internal user authentication as follows.

Figure 8:
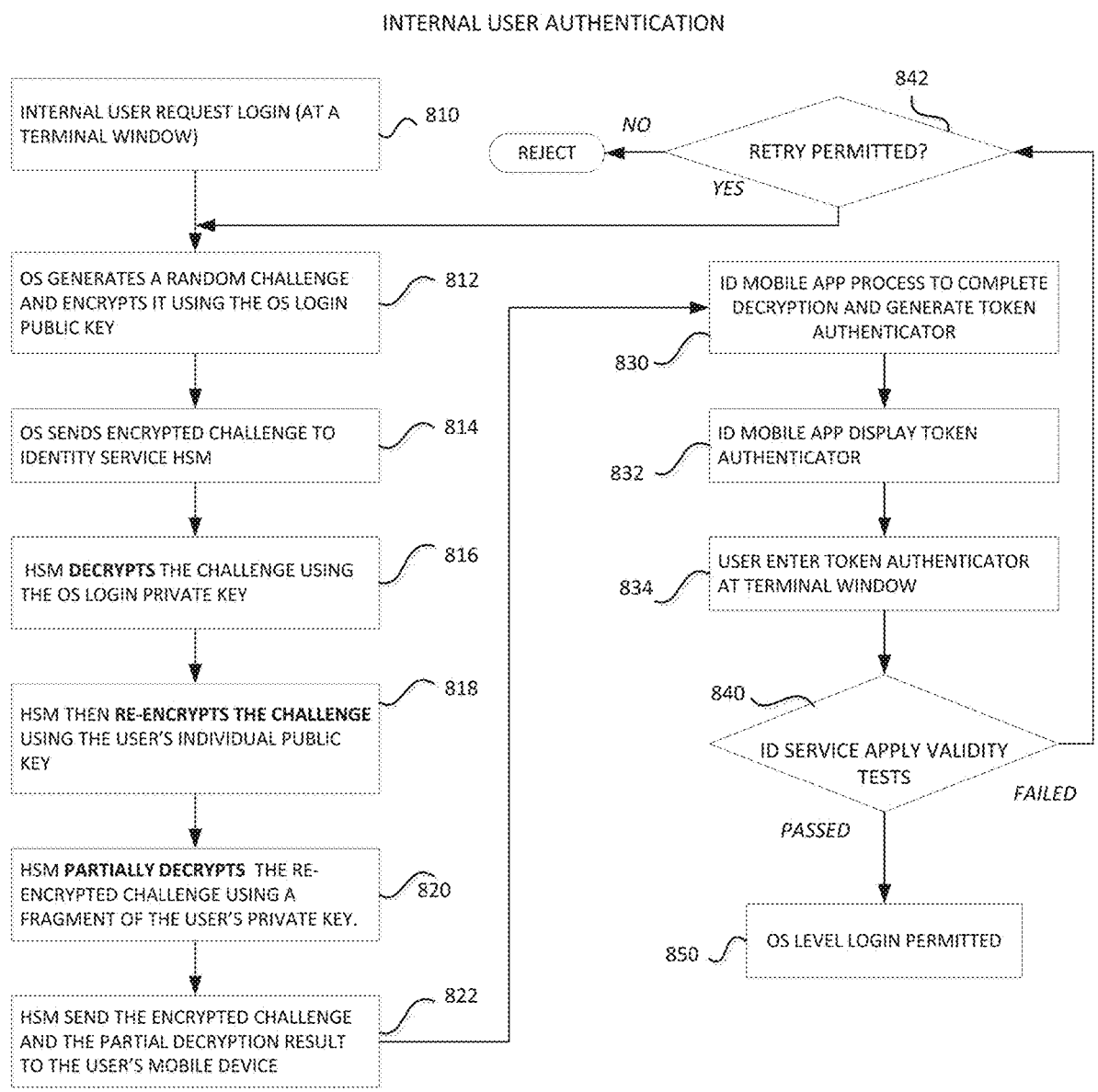
FIG. 8 shows a simplified flow diagram of an example process for secure internal user authentication and login to an information system.

FIG. 8 shows a simplified flow diagram of an example process for secure internal user authentication for OS level login to an information system. In this example, a user requests a login, block 810, for example, at a terminal window of a production host in the information system. The OS in the host, which may be an application server, generates a random challenge, and encrypts the challenge using the OS level login public key, block 812. The OS sends the encrypted challenge to an ID service, block 814, which may be, for example, the security service 732 provisioned in an HSM 730, as illustrated in FIG. 7.

The ID service decrypts the received challenge, utilizing the OS login private key, block 816. Then, the ID service re-encrypts the challenge, block 818, using the user's individual public key, block 818. In some embodiments, the ID service may access a datastore (such as 740 in FIG. 7) where individual user information, for example, profiles and public keys, together with corresponding private key fragment are stored. Then, the ID service partially decrypts the re-encrypted challenge, block 820, using a fragment of the user's private key. Details of private key fragmentation were explained above with regard to FIGS. 4A, 4B and A and 5B.

Next, the ID Service sends (a) the encrypted challenge, and (b) the partial decryption result to the user's device, block 822. The user device may be a mobile device. Preferably it is a machine capable of executing an application program. For example, the user's mobile device may be a smartphone, laptop computer, tablet computer, wearable computer, etc. It may be in the form of a watch, exercise monitor, Fitbit®, etc. (trademark of Fitbit, Inc.) It should be something associated with the user, and generally in their physical possession or control. Preferably, if the user's mobile device has security features, such as thumbprint or other biometric sensors for lockout, these may improve security of the process but they are not required. For illustration, we use a smartphone as the user's mobile device, shown at 70 in FIG. 7. We assume the client device has a login application or ID mobile app 72 installed that is operable as described earlier with regard to FIGS. 2, 3 and others.

Again referring to FIG. 8, at the user's mobile device, block 830, the ID mobile app processes the received encrypted challenge, along with the partial decryption result, to complete decryption of the challenge, as explained earlier. The ID mobile app generates a token authenticator based on the decrypted challenge. The mobile app may display the token authenticator on a display screen (or other output device or user interface), block 832, so it is available to the user. In an embodiment, a user then enters the token authenticator generated by the mobile app into the terminal window or other interface where the user is requesting login to the system, block 834. It may be entered manually at a keyboard, for example. In another embodiment, the mobile app may itself supply the token authenticator to the ID Service. Then the ID Service applies at least one validity test to the token authenticator, decision 840, to confirm that the original challenge was decrypted correctly. The ID Service or OS may compare the received token authenticator to the original challenge or to data derived from the challenge such as a hash. Other validity tests such as time elapsed may be applied as described earlier. If the token authenticator is found to be valid, i.e. all applicable tests are passed, the ID Service sends an indication to the OS, block 850, to permit the OS level login to be completed.

Various embodiments of the methods and systems disclosed will enable highly secure access control for internal (authorized) persons who need service account access to information systems, including very large systems. The techniques are scalable and easy to maintain, even though the information system, and the set of internal users, is changing dynamically.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A computer-implemented authentication method to authenticate a user to permit OS level login to a server in a computing system, comprising the steps of:
   registering an internal user including acquiring an asymmetric encryption key pair associated with the user, the key pair consisting of a public key and a private key;
   splitting the user's private key into plural private key fragments;
   storing one of the user's private key fragments securely in a mobile device associated with the user;
   storing the user's public key and a different one of the plural private key fragments in a datastore accessible to the server;
   at the server, receiving an OS level login request;
   responsive to the login request, generating a random challenge, and transmitting the random challenge in encrypted form from the server to a security system component provisioned on a second, secure server;
   at the server, receiving from the security system component, the random challenge re-encrypted using the user's public key, and a partial decryption result generated using the user's private key fragment stored in the datastore;
   transmitting the re-encrypted challenge and the partial decryption result to the mobile device associated with the user;
   receiving a token authenticator entered at the server;
   testing validity of the token authenticator so as to demonstrate that the user who made the login request had access to the said mobile device, and that the mobile device correctly completed decryption of the challenge and generated the token authenticator based on the decrypted challenge; and
   permitting the OS level login request, conditioned on an affirmative result of the validity testing.

2. The method of claim 1 including:
   acquiring an asymmetric encryption key pair for OS level login authentication for a first group of machines, the encryption key pair consisting of an OS level login public key and an OS level login private key;
   storing the OS level login public key in a manner accessible to the server OS for use in encrypting the challenge; and
   storing the OS level login private key securely in the security system for use in decrypting the challenge.

3. The method of claim 2 wherein said transmitting the random challenge in encrypted form from the server to the security system component includes encrypting the challenge using the OS level login public key.

4. The method of claim 3 and further comprising:
   providing a login mobile application executable on a mobile device, the mobile application configured to cause a processor of the mobile device to—
   acquire an asymmetric key consisting of a public key and a private key;
   associate the public key and the private key with a user of the mobile device;
   split the private key into plural private key fragments, so that a sum of the plural private key fragments equals the private key;
   securely store at least one of the private key fragments on the mobile device; and
   transmit a different one of the private key fragments to a server in connection with registration of the user, mobile device pair on the server.

5. The method of claim 4 wherein the mobile application is further configured to cause a processor of the mobile device to—
   receive an encrypted challenge and a partial decryption result;
   complete decryption of the challenge using the partial decryption result and the private key fragment stored on the mobile device;
   generate a token authenticator based on the decrypted challenge; and
   output the token authenticator to a user interface of the mobile device as a single-use token.

6. The method of claim 3 and further comprising:
   providing a login mobile application executable on a mobile device, the mobile application configured to cause a processor of the mobile device to register a user of the mobile device with the ID Service of the computing system;
   wherein said registration includes—
   splitting the user's private key into plural private key fragments;
   storing one of the user's private key fragments in the mobile device; and
   sending the user's public key and a different one of the plural private key fragments to the computing system.

7. The method of claim 3 including provisioning the security system for execution on a hardware security module (HSM).

8. The method of claim 3 including:
   acquiring a second asymmetric encryption key pair associated with a second OS level login, the second encryption key pair consisting of a second OS level login public key and a second OS level login private key;
   storing the second OS level login public key in a manner accessible to a second group of machines; and
   storing the second OS level login private key securely in the security system component to support authenticating users for login to the second group of machines.

9. The method of claim 8 wherein the second group of machines is defined by data center, a geographic location, cluster, or role of the second group of machines.

10. The method of claim 3 including:
    persisting user data in the datastore including a plurality of different internal users' individual public keys and private key fragments;
    updating the user data to include additional internal users' data based on authorization of the additional internal users to OS level login to the first group of machines; and removing from the datastore user data of internal users who are no longer authorized for OS level login to the first group of machines;

thereby managing OS level login access for the entire computing system based on the datastore without requiring internal users to use individual passwords.

11. The method of claim 3 wherein testing validity of the token authenticator includes at least one of checking a timestamp relative to a predetermined time to live of the challenge, or checking a number of failed login attempts relative to a predetermined limit.

12. The method of claim 3 wherein the token authenticator includes a cryptographic (one-way) hash function or digest of the decrypted challenge.

13. The method of claim 3 wherein:

the first group of machines comprises application servers; and the second group of machines comprises storage servers.

14. A non-transitory, computer readable medium storing instructions executable by a processor to cause the processor to realize a security system component including carrying out the steps of:

receiving from an application server a random challenge generated in response to an OS level login request at the application server, the random challenge encrypted using an OS level login public key;

decrypting the encrypted challenge using an OS level login private key that is associated with the OS level login public key so as to recover the challenge;

re-encrypting the challenge using a public key of a user identified in connection with the login request;

partially decrypting the re-encrypted challenge using a stored private key fragment of the user to form a partial decryption result;

transmitting the re-encrypted challenge and the partial decryption result to a mobile device associated with the user;

receiving a token authenticator associated with the login request; and testing validity of the token authenticator so as to determine that the user who made the login request had access to the said mobile device, and that the mobile device correctly completed decryption of the challenge and generated the token authenticator based on the decrypted challenge.

15. The non-transitory, computer readable medium of claim 14 wherein the stored instructions further cause the processor to conduct additional validity testing of the token authenticator based on a time to live of the challenge.

16. A system comprising:

an application server computer having an operating system;

the application server computer including a first network interface configured for communications over an internal network and a second network interface configured for communications over an external network;

a secure server communicatively coupled to the internal network to enable communications with the application server computer;

an ID Service provisioned on the application server computer;

a security system provisioned on the secure server and configured for interaction with the ID Service;

a datastore accessible via the internal network, the datastore persisting selected user data, including, for at least one user who is authorized for OS level login to the application server computer, a public key of an asymmetric encryption key pair associated with the user, a private key fragment based on a private key of the encryption key pair associated with the user, and an identifier of a mobile device associated with the user;

an asymmetric encryption key pair associated with OS level login to the application server computer;

wherein a public key of the OS level login key pair is stored on the application server computer in a manner accessible to the OS, and a private key of the OS level login key pair is stored on the secure server in a secure manner so that it is not accessible over the internal network; and wherein the OS is configured to receive a login request and to utilize the ID Service and the security system to authenticate a user identified in the login request, wherein the OS is configured to, responsive to the login request— generate a random challenge;

encrypt the random challenge using the OS level login public key;

transmit the encrypted challenge to the security system;

responsive to the encrypted challenge, receive from the security system a re-encrypted challenge and a partial decryption result associated with the re-encrypted challenge;

transmit the re-encrypted challenge and the partial decryption result to the mobile device associated with the user identified in the login request;

receive a token authenticator at the application server;

test validity of the received token authenticator based at least in part on the random challenge; and enable the OS level login request conditioned on an affirmative result of the validity test.

17. The system of claim 16 wherein the secure server hosts a security module.

18. The system of claim 16 wherein the security system is configured to— decrypt the encrypted challenge using the private key of the OS level login key pair;

re-encrypt the challenge using the public key associated with the user; and partially decrypt the re-encrypted challenge using the fragment of the private key associated with the user to form the partial decryption result.

19. The system of claim 18 wherein the OS is further configured to receive the login request and the token authenticator at a user interface of the application server.

* * * * *